United States Patent [19]

Almond et al.

[11] Patent Number: 4,553,601

[45] Date of Patent: Nov. 19, 1985

[54] METHOD FOR FRACTURING SUBTERRANEAN FORMATIONS

[75] Inventors: Stephen W. Almond, Ventura, Calif.; Michael W. Conway, Duncan, Okla.

[73] Assignee: Halliburton Company, Duncan, Okla.

[21] Appl. No.: 654,823

[22] Filed: Sep. 26, 1984

[51] Int. Cl.$^4$ ............................................. E21B 43/267
[52] U.S. Cl. .................. 166/308; 252/8.55 R
[58] Field of Search .................. 166/271, 281, 308; 252/8.55 R

[56] References Cited

U.S. PATENT DOCUMENTS

| | | | |
|---|---|---|---|
| 3,417,820 | 12/1968 | Epler et al. | 166/308 |
| 3,446,795 | 5/1969 | Boudreaux et al. | 252/8.55 R X |
| 3,483,121 | 12/1969 | Jordan | 252/8.55 R |
| 3,741,894 | 6/1973 | Storfer | 252/8.55 R X |
| 3,765,488 | 10/1973 | Pence, Jr. | 166/308 |
| 3,954,626 | 5/1976 | Greminger, Jr. et al. | 166/308 X |
| 4,350,601 | 9/1982 | Mosier et al. | 252/8.55 R |
| 4,502,967 | 3/1985 | Conway | 252/8.55 R |

*Primary Examiner*—George A. Suchfield
*Attorney, Agent, or Firm*—Robert A. Kent; Thomas R. Weaver

[57] ABSTRACT

The present invention relates to a thermally stable crosslinked gel fracturing fluid for use in the treatment of subterranean formations penetrated by a well bore. The fracturing fluid comprises an aqueous liquid, a gelling agent comprising a selected modified cellulose ether, a crosslinking agent and any additional additives that may be present. The fracturing fluid is thermally stable under shear at temperatures in excess of about 200° F.

17 Claims, No Drawings

METHOD FOR FRACTURING SUBTERRANEAN FORMATIONS

BACKGROUND OF THE INVENTION

The present invention relates generally to methods and compositions for fracturing well formations, and more particularly, but not by way of limitation, to methods and compositions for fracturing well formations penetrated by a well bore wherein a fracturing fluid composition, with or without propping agent suspended therein, is injected into the formations through the tubing or casing at a rate sufficient to open a fracture in the formation.

Fracturing porous subterranean formations penetrated by a well bore has been widely employed for increasing the production of fluids, such as, crude oil, natural gas, and the like from said formations. The usual technique of fracturing a formation comprises introducing a fluid into the well under sufficient pressure to force the fluid out into the formation to fracture the formation and thereby alter the formation's permeability. The technique is not limited to formations of low permeability such as certain limestones, dolomite and the like, but also is applicable to other types of formations such as a sandstone containing streaks or striations of relatively high permeability and other zones of low permeability.

During the pressured injection of the gelled compositions described herein, passageways for fluid flow are created in the formation, or existing passageways therein are enlarged, thus stimulating the production of fluids from the formation.

Hydraulic fracturing is widely used to stimulate production from oil and gas wells completed in low permeability formations, and many methods and compositions for hydraulically fracturing subterranean well formations penetrated by a well bore have been developed.

Commonly, a fracturing fluid is pumped through the tubing or casing disposed in the well bore into the formation sought to be fractured. The fracturing fluid is pumped at a rate sufficient to open a fracture in the exposed formation, and extend the fracture from the well bore into the formation. Continued pumping of said fracturing fluid containing a propping agent into said fracture results in proppant placement within the fractured zone. Following the treatment, the fracturing fluid is recovered from the well, leaving the proppant remaining in the fracture, thereby preventing the complete closure thereof and forming a permeable channel extending from the well bore into the formation.

The conductivity of the propped fracture depends, among other things, on the size of the propping agent particles placed in the fracture. This, in turn, depends upon the width to which the particular fracture may be opened during injection of the fracturing fluid, and this normally requires that such fluids have very high viscosities. The use of fracturing fluids having relatively high viscosities is advantageous since such fluids can support the propping agent particles suspended therein without excessive settling. Also, relatively large size propping agent particles can be placed in the formation using high viscosity fracturing fluids since wider fractures generally result, reducing the possibility of the propping agent bridging across the mouth of the fracture and accumulating in the well bore, a condition commonly referred to as "screen-out".

A problem encountered in fracturing operations, particularly when employing compositions having thickening or viscosifying agents incorporated therein, is stability to heat. By stability to heat is meant the retention of the increased or greater viscosity properties under the conditions of use. Such compositions to be satisfactory should be sufficiently stable to resist degeneration by the heat of the formation for a period of time sufficient to accomplish the intended purpose, that is, good penetration and significant fracturing of the formation. The degree of stability required in any particular operation will vary with such operating variables as the type of formation being treated, the temperature of the formation, the well depth (time to pump the gelled composition down the well and into the formation), the polymer concentration of the composition, and the like.

The temperature of the formation usually has a pronounced effect on the stability of the gelled compositions and, generally speaking, is one of the most important operating variables when considering stability. Increased formation temperatures usually have at least one undesirable effect. Such an effect can be degeneration of the compositions, that is, a decrease in viscosity. Thus, some compositions which would be satisfactory in a low temperature formation might not be satisfactory in formations having higher temperatures, such as are encountered in deeper wells.

In certain fracturing operations using unthickened fluid there is usually no problem in removing the injected fluid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation or in the fracture. This can inhibit the production of fluids from the formation and can require costly cleanup operations. It would be desirable to have gelled compositions which break down to a lesser viscosity within a short time after the operation is completed.

Presently, guar gum and guar gum derivatives along with other natural gums are utilized in the preparation of viscous fluids utilized in the treatment of subterranean formations to provide adequate viscosity to the fluid when utilized at temperatures in excess of about 125° F. to about 350° F. Guar gum and the guar derivatives have the capability of being crosslinked by a variety of polyvalent metals, such as, for example, titanium, zirconium, chromium, antimony, niobium, and the like. While not entirely satisfactory, these viscosifiers form a "gelled" fracturing fluid having a sufficient viscosity to transport proppant into a subterranean formation. However, guar and the other gums typically contain substantial amounts, that is, from about 1.5 to in excess of 10 percent by weight of insoluble matter. The presence of such insoluble matter in a fluid is highly undesirable since it may clog the pores of the formation or the fracture.

It would appear that cellulose ethers, such as hydroxyethylcellulose, would be a viable alternative to guar gum, guar derivatives or other gums for use in fracturing fluids because of its substantially lower insoluble matter content. However, such has not been the case because the cellulose ethers have generally been unable to provide fracturing fluids having the necessary viscosity at elevated temperatures which can be achieved through the use of guar gum and guar derivatives. Further, hydroxyethylcellulose and its derivatives generally have not been capable of adequate crosslinking, which is prerequisite necessary, to provide sufficient viscosity levels for more severe applications.

The present invention provides a solution for, or at least mitigates, the above-discussed problems. The present invention provides improved methods for fracturing subterranean formations utilizing a novel gelling agent.

SUMMARY OF THE INVENTION

The surprising discovery now has been made that a novel composition including a selected gelling agent prepared by incorporation of a pendent vicinal dihydroxy structure which assumes or is capable of assuming a cis geometry in hydroxyethylcellulose or another selected cellulose ether provides a fracturing fluid which can be crosslinked by a variety of metal ions to provide gelled fracturing fluids which exhibit shear-thermal stability at elevated temperatures in excess of 250° F.

The gelled fracturing fluid is introduced into a subterranean formation through a well bore penetrating the formation. The fracturing fluid is introduced into the formation at a rate and pressure sufficient to fracture the formation. The fracturing fluid may contain a propping agent suspended therein to prop the fracture and provide an open passageway. The fracturing fluid also may incorporate a breaker to facilitate controlled fluid viscosity reduction and facilitate fluid recovery or a gel stabilizer at higher temperatures to reduce the rate of degradation such that the treatment can be successfully placed in the formation.

DESCRIPTION OF THE PREFERRED EMBODIMENT

The present invention provides a method and composition for use in fracturing subterranean formations penetrated by a well bore. The fracturing fluid composition comprises an aqueous liquid, a novel gelling agent and a crosslinking agent. The fracturing fluid can carry substantial quantities of a propping agent into a subterranean formation without premature settling and can be pumped into the formation utilizing pumping equipment and tubular goods normally available at a wellhead.

An aqueous liquid is used to hydrate the novel gelling agent prior to crosslinking. The aqueous liquid must be of a pH which is compatible with the crosslinking agent used to crosslink the hydrated gelling agent. The aqueous liquid generally may have a pH of from about 2.0 to about 11 when contacted with the gelling agent without adversely effecting hydration of the gelling agent or the subsequent properties of the gelled fracturing fluid.

The gelling agent of the present invention comprises a derivatized cellulose ether. While the present invention will be principally described in conjunction with the use of hydroxyethyl cellulose as the cellulose ether, it should be appreciated that other cellulose ethers could be similarly utilized. For example, hydroxypropylcellulose, carboxymethylcellulose, alkyl celluloses such as methyl and ethyl cellulose, mixed ethers, such as, carboxymethylhydroxyethylcellulose and the like can be utilized under appropriate conditions.

The gelling agent of the present invention must be water soluble. As is known, hydroxyethylcelluloses having a molar substitution (MS) of from about 1.5 to about 3.5 or so are water soluble. Regardless of whether the starting material in the formation of the gelling agent is water soluble, it is satisfactory if the resulting product is water soluble. Thus, the present invention may utilize substantially any polysaccharide which is capable of incorporation of the pendent vicinal dihydroxy structure to be described hereafter.

The gelling agent of the present invention comprises a cellulose ether which is chemically modified to incorporate pendent vicinal dihydroxy groups which assume or can assume cis geometry. Hereinafter, to facilitate an understanding of the present invention, specific reference will be made to a cellulose ether comprising hydroxyethylcellulose. The incorporation of the vicinal dihydroxy groups may be achieved by reaction of the hydroxyethylcellulose with purified glycidol, which is a commercially available compound.

Glycidol derivatives or compounds such as 3-chloro-1,2-propanediol (hereinafter "CPD"), which forms glycidol in situ, also may be utilized. The use of a high purity material is desirable to minimize the impurities which can interfere with the desired performance of the resulting product. In addition, other compounds which will provide a pendent vicinal dihydroxy structure, such as, for example, 2,3-epoxy-1,4-butanediol also may be utilized.

Similarly, what will be termed herein "crude glycidol" may be employed to incorporate the desired pendent vicinal dihydroxy structure. To this end, high purity CPD is dissolved in a suitable solvent, such as, for example, ethanol, isopropanol or t-butanol; and the temperature is adjusted to about 65° F. ($\pm 4$° F.). Sodium hydroxide (50% by weight aqueous solution) is added over a period of about one hour or so with cooling to maintain the temperature at about 65° F. After the addition is complete, the reaction mixture is allowed to stand at ambient conditions for about 40 minutes or so. The reaction mixture is then filtered, and the resulting filtrate may be used without further processing to react with the hydroxyethylcellulose to synthesize the gelling agents of the present invention.

The crude glycidol should be used relatively promptly after preparation, that is, within one or two days or so. Thus relatively prompt use avoids a number of undesirable reactions which otherwise can take place which could result in hydrolysis of the glycidol, polymerization thereof, and the like. Storage of the crude glycidol at low temperatures can prolong the useful life somewhat.

It should be appreciated that the reaction conditions set forth herein to produce the crude glycidol are merely exemplary. What is considered important is that the synthesis take place in essentially an organic media, other than the water associated with the addition of the sodium hydroxide. This insures that the amount of water in the crude glycidol will not be so excessive as to require further processing to reduce the water level to that desired for reaction with the hydroxyethylcellulose. It is also desirable to utilize a caustic level which will insure that essentially no sodium hydroxide will remain after completion of the reaction and to carry out the reaction at essentially ambient temperature conditions.

Still further, the pendent vicinal dihydroxy structure may be incorporated by use of an aromatic polyol wherein at least two hydroxyl groups are located on adjacent carbon atoms. This structure will be essentially equivalent to the vicinal dihydroxy structure on aliphatic alcohols which assumes, or can assume, cis geometry.

The incorporation of the pendent vicinal dihydroxy structure can be carried out by, in general, using the standard slurry techniques known for preparing cellulose ethers. However, care must be taken with the process parameters selected to insure that the resulting end product has the desired characteristics.

The basic procedure involved is summarized in the following series of equations:

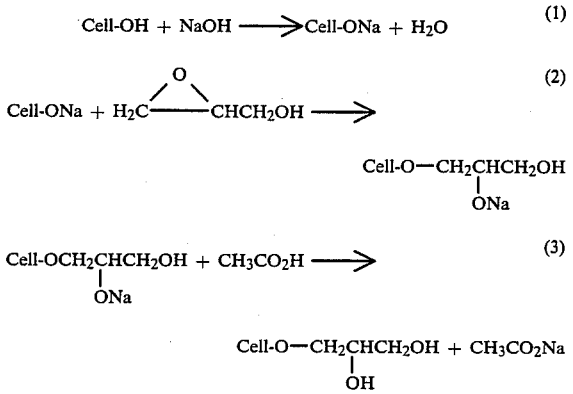

wherein "Cell" represents the cellulosic backbone.

A variety of diluents, such as, for example, alcohols, ketones and the like, and mixtures thereof are known for use in forming cellulose ethers. It is preferred to utilize acetone since polysaccharide products having improved performance characteristics have been provided. Isopropanol and t-butanol also have been found satisfactory.

The ratio of the diluent to the hydroxyethylcellulose may be varied within wide limits. The product obtained does not appear to be particularly sensitive to the ratio employed. It has been found suitable to utilize weight ratios in the range of at least about 4:1 to about 25:1 or more, more desirably about 5:1 to about 10:1. The use of relatively high ratios of diluent to hydroxyethylcellulose tend to require longer reaction times to provide products with the requisite characteristics.

A wide variety of alkaline materials are known for use in preparing cellulose ethers and may be employed. It is preferred to utilize sodium hydroxide; however, other useful materials which may be used include, for example, potassium hydroxide and lithium hydroxide. The molar ratio of caustic/hydroxyethylcellulose may suitably vary from about 0.4:1 or lower to 0.8:1 or so, more desirably about 0.5:1 to about 0.8:1. Based upon present data, it is believed that products capable of imparting improved performance are obtained with lower caustic levels. The reaction of glycidol with hydroxyethylcellulose is catalytic so that the sodium hydroxide or other caustic used is not consumed. The amount of caustic utilized must be adequate to causticize the hydroxyethylcellulose, but increased amounts of caustic could result in increased nucleophilic attack of hydroxyl ions on glycidol, resulting in a lowering of the effective amount of glycidol available for reaction.

Cellulosics that are in contact with any base may be readily degraded by oxygen. It is accordingly necessary to exclude oxygen from the reaction vessel during the entire time in which caustic is present. It is suitable to carry out the reaction under a continuous flow of an inert gas such as nitrogen.

It is desirable to provide vigorous stirring so as to provide for more complete reaction and a more homogeneous product. Causticized cellulosics tend to be more gelatinous and viscous than normal cellulosics, and compensation for such should be kept in mind when selecting the stirring apparatus.

The reaction is carried out by adding glycidol over a period of time to a slurry of the hydroxyethylcellulose in acetone or other diluent used which contains water and the caustic. The amount of water employed should be limited to the amount needed to swell the cellulose to allow the reaction to take place since increased amounts tend to provide products having less than optimum characteristics. When acetone is employed as a diluent, the amount of water may vary from about 5 percent to at least 20 percent or more, more desirably about 7 percent to about 13 percent, based upon the total weight of the water and acetone, a level of about 10 percent or so being preferred. When using isopropanol as a diluent, the range of water that may be used is significantly narrower, an amount of about 5 percent by weight water being desirable.

While addition all at once is acceptable, the glycidol is more desirably added over a period of time at the reaction temperature and then allowed to cook-out or react until completion. The conditions during the glycidol addition should be such as to minimize catenation. It is thus more desirable to add the glycidol slowly enough to achieve efficient mixing and to have a relatively homogeneous reaction mixture so as to minimize or eliminate localized areas of relatively high glycidol concentration. The reaction is desirably carried out at a temperature in the range of from ambient conditions or so up to that of reflux conditions for the diluent system being employed. When carrying out the reaction under reflux conditions, it appears that the overall time of reaction involved is more important than the length of addition and completion, although it has been found desirable to provide an addition time of at least about one hour or so. It has been found satisfactory to use total reaction times of about 2 to about 5 hours or so under reflux conditions. The use of lower temperatures will require longer reaction times.

The amount of glycidol utilized should in a functional sense be sufficient to incorporate an adequate number of the pendent vicinal dihydroxy groups to provide, upon crosslinking, a polymer having the desired performance characteristics. Purified glycidol (that is, distilled glycidol) is a relatively expensive component, and no substantial benefits are obtained by using excessive amounts. Weight ratios of glycidol/hydroxyethylcellulose in the range of about 0.15:1 to about 0.65:1 should be suitable. A ratio of about 0.15 or so should provide a degree of substitution (DS) of about 0.3 while a ratio of 0.65:1 should provide a DS of about 1.3, assuming a 50% efficiency of incorporation of the glycidol. It has been found more desirable to utilize glycidol amounts adequate to provide a DS in the range of about 0.5 to about 1.2. A preferred derivative utilizes glycidol amounts adequate to provide a DS in the range of from about 0.7 to about 0.9.

The efficiency can be estimated by mass balance, determined by weight gain of the product corrected for the salt formed from neutralizing the product, such as, for example, sodium acetate when acetic acid is used.

In addition, the pendent vicinal dihydroxy content may be determined by a periodate oxidation as is known (*Quantitative Organic Analysis via Functional Groups*), Siggia and Hanna, Fourth Edition, 1979, John Wiley and Sons, pp. 42–43). The trans-1,2-diols in the glucose units of the cellulose backbone should not interfere with the titration of the pendent dihydroxy groups. Accordingly, unlike the theoretical and mass balance MS, which measure the total glycidol incorporation into the polymer, the titrated MS measures only the glycidol incorporated which still retains the vicinal dihydroxy structure. This technique thus discriminates between the glycidol incorporated internally in the pendent chain and the glycidol incorporated at the end of the pendent chain. The titrated MS therefore measures the number of available vicinal dihydroxy crosslinking sites per anhydrogluclose unit, and is more properly considered a measure of the degree of substitution (DS). The DS values set forth herein are accordingly determined by the periodate oxidation test.

The resulting product should be neutralized, as is known, to a slightly acidic pH to provide a product stable in air. Any of a variety of acids may be employed, as is known in conjunction with the preparation of cellulose ethers. The salts which result from the neutralization should be maintained at a minimum.

The product which results may be washed and then dried to isolate the product as a powder. The particular conditions under which these steps are carried out are well known to individuals skilled in the art. As an illustrative example, it is suitable to wash with an acetone/water mixture one or more times, followed by washing, one or more times with acetone. Drying may be accomplished in a vacuum at a temperature of, for example, 122° F.

After washing, if it is desired to provide a product which has slower hydration characteristics, the polysaccharide may be treated with a dialdehyde such as glyoxal. Techniques of this type are known and may be used.

The gelling agent of the present invention is admixed with the aqueous liquid in an amount sufficient to provide a desired viscosity to the gelled fracturing fluid. Generally, the gelling agent should be present in an amount in excess of about 0.2 percent by weight of the aqueous liquid. Preferably, the gelling agent is present in an amount of from about 0.2 to about 3.0 percent by weight of the aqueous fluid. Most preferably, the gelling agent is present in an amount of from about 0.3 to about 1.5 percent by weight of the aqueous liquid. Gelling agent concentrations below about 0.2 percent by weight generally provide insufficient amounts of the gelling agent to provide the crosslinked fracturing fluid the desired properties of viscosity and stability.

The hydrated gelling agent is admixed with a crosslinking agent to crosslink the polysaccharide and provide a shear-thermal stable fluid suitable for use in the treatment of subterranean formations. The crosslinking agent can comprise any compound which is soluble in the hydrated gelling agent solution and capable of forming a crosslinked structure with the gelling agent whereby the viscosity of the fluid is increased and the gelled fluid exhibits shear-thermal stability at elevated temperatures, of from about 150° F. to in excess of about 275° F. The crosslinking agent of the present invention can comprise any compound which provides the following ions in a soluble form in the oxidation state indicated: titanium (IV), zirconium (IV), antimony (III), antimony (V) and boron (III). Additional compounds which would be expected to crosslink the gelling agent are those which provide ions in the following oxidation states: lead (II), aluminum (III), arsenic (III), chromium (III) and niobium (V) and the like. The crosslinking agent is comprised of one of the above compounds and a second element or compound. The second element or compound may be any which will release the above ions in solution. The preferred crosslinking agents are compounds containing titanium (IV) or zirconium (IV). For example, compounds which can be used to supply the titanium (IV) ions for crosslinking are organotitanate chelates such as titanium acetylacetonate chelate, titanium triethanolamine and titanium ammonium lactate chelate. Such compounds are available from, for example, E. I. duPont deNemours and Company, Inc.

Compounds which supply zirconium (IV) ions are zirconium acetylacetonate, zirconium lactate, zirconium carbonate and zirconium diisopropylamine lactate. Various of such compounds are available from companies such as: Kay Fries, Rockleigh, N.J., Magnesium Electron, Starret, Tex. and Zirconium Technology, Gainsville, Fla.

Compounds supplying antimony (III) ions are potassium antimony tartrate, antimony tartrate and antimony oxalate. Antimony (V) ions may be derived, for example, from potassium pyroantimonate.

Compounds supplying aluminum (III) ions are exemplified by $AlCl_3$, $Al(OAc)_3$, and the like.

Compounds supplying arsenic (III) ions are $As_2O_3$, $AsCl_3$ and $AsOCl$.

Compounds supplying chromium (VI) ions are $Na_2Cr_2O_7$, $K_2Cr_2O_7$ and $Na_2CrO_4$ which are reduced in situ to Cr (III).

A compound supplying niobium (V) ions is niobium pentachloride.

The crosslinking agent when comprising a source of titanium (IV) or zirconium (IV) ions or other selected compounds also may include a polyhydroxyl-containing compound which functions to retard the crosslinking rate of the gelling agent. The polyhydroxyl-containing compound can comprise, for example, glycerol, erythritol, threitol, ribitol, arabinitol, xylitol, allitol, altritol, sorbitol, mannitol, dulcitol, iditol, perseitol and the like. The polyhydroxyl-containing compound, if present, should be in an amount sufficient to retard the crosslinking rate of the crosslinking agent. Generally, the polyhydroxyl-containing compound may be present in an amount of from about 0.001 to about 0.25 percent by weight of the aqueous liquid.

The crosslinking agent of the present invention generally is present in an amount of at least about 0.001 percent by weight of the aqueous liquid. Preferably, the crosslinking agent is present in an amount of from about 0.001 to about 0.5 percent by weight and, most preferably, from about 0.01 to about 0.1 percent by weight of the aqueous liquid.

The crosslinked gel may have a pH in the range of from about 2.0 to about 11.0 and provide the desirable thermal stability to the gel at temperatures in excess of about 250° F.

Any of a variety of conventional propping agents may be employed with the fracturing fluid compositions of the present invention such as quartz sand grains, tempered glass beads, sintered bauxite, resin coated sand, aluminum pellets, nylon pellets and similar materials. Such agents are generally used in concentrations between about 1 to about 10 pounds per gallon of the fracturing fluid composition, but higher or lower concentrations may be used as required. The size of propping agent employed depends on the particular type of formation to be fractured, pressure and pumping rates available and other factors. However, particles up to about 2 mesh on the U.S. Sieve Series scale may generally be employed in fracturing well formations with the compositions of the present invention without screen-out occuring.

If desired, a buffer may be included in the fracturing fluid to maintain the pH within a range of about 2.0 to 10. Any buffer system which will maintain the pH of the fracturing fluid within this range is suitable so long as the buffer does not unduly interfere with the crosslinking reaction. As an example, a maleic acid-sodium hydroxide buffer may be employed. Other buffers which also may be used comprise sulfonic acid, sodium diacetate, fumaric acid-sodium bicarbonate or sodium bicarbonate-sodium carbonate.

In addition, so long as the particular materials employed do not adversely interfere with the crosslinking reaction, any of a variety of auxiliary agents used in conventional hydraulic fracturing fluids may be included. For example, friction reducers, biocides, surfactants, auxiliary thermal stabilizers, fluid loss agents, and the like are known in the art and may be employed.

The gelled fracturing fluid of the present invention is used by pumping it into a well bore traversing the subterranean formation sought to be fractured. Said gel is pumped at a rate sufficient to fracture the formation and to place propping agents in the fracture.

The composition may be prepared for use by mixing a predetermined quantity of the hydratable gelling agent with a quantity of water to form a hydrated gel. Any suitable conventional batch mixing apparatus may be employed for this purpose. After the gelling agent and the water have been mixed for a time sufficient to form a hydrated gel, a quantity of crosslinking agent is mixed with the hydrated gel, and the mixture is pumped into the well bore as the crosslinking reaction takes place. Propping agents are generally added to the hydrated gel prior to the addition of the crosslinking agent and as the hydrated gel is pumped to the well bore.

Once the crosslinked fracturing gel has been pumped into the subterranean formation and a fracture has been formed, it is desirable to "break" the gel into a fluid having low viscosity so that it can be either pumped or produced from the formation through the well bore. There are various means available for breaking the fracturing fluid of the present invention. Most of the fracturing fluids of the present invention will break into a low viscosity fluid with time and temperature. However, it is usually more desirable to have a predictable breaking time within relatively narrow limits. Therefore, breakers may be included in the fracturing gel of the present invention as an optional element. Mild oxidizing agents are useful as breakers when a crosslinked fracturing gel is used in a relatively high temperature formation, although formation temperatures of 200° F. or greater will generally break said fracturing gel relatively quickly without the aid of an oxidizing agent. Suitable oxidizing agents are ammonium persulfate, potassium dichromate and potassium permanganate. For fracturing gels used at temperatures below about 140° F., enzymes are generally used as breakers. Suitable enzymes for such use are alpha and beta amylases, amyloglucosidase, oligoglucosidase, invertase, maltase, cellulase and hemicellulase.

The following examples are provided to illustrate the novel thermal stability and utility of the fracturing fluid of the present invention, and the invention is not to be considered as limited thereto.

To illustrate the thermal stability of the fracturing fluid of the present invention when the fluid is undergoing shear, the following tests were performed.

A base gel is prepared by admixing a quantity of the gelling agent in tap water. The particular concentration of the gelling agent employed in each test is set forth in the following Tables. Buffers, when present, were also admixed with the base gel. The buffer and its concentration is set forth in the following tables. The initial pH of the sample after addition of the buffer is set forth in the following tables. The gelling agent was permitted to hydrate for 4 hours. A 250 ml sample of the base gel then is placed in a Waring Blender and mixed at the maximum speed which could be obtained without resulting in significant air entrainment. The crosslinking agent then was admixed with the base gel in the quantity indicated in the following tables. Mixing of the sample was continued for five minutes after addition of the crosslinking agent. The mixing of the sample simulates the shear forces the fracturing fluid will undergo during injection into a subterranean formation. A quantity of the sheared sample then was introduced into a Model 39B Fann viscometer. The viscometer was fitted with a #2 bob and #1 spring. The sample was heated in the viscometer from about ambient temperature to about 200° F. Viscosity sweeps were made at 450, 400, 350, 325, 300, 250, 200, 150 and 100 rpm initially and at 20° F. increments from 100° F. to 200° F. The sample was sheared at 100 rpm during the intervals between the viscosity sweeps. A viscosity sweep also was made every 10 minutes for 30 minutes when the sample attained the 200° F. temperature. Upon conclusion of the test the final pH of the sample was determined and is set forth in the tables. The apparent viscosity of the fluid then was calculated from the viscosity sweep data.

The calculated apparent viscosities at 170 sec$^{-1}$ are set forth in the following tables. To facilitate evaluation, Table 1 sets forth data for a fluid sample to which no crosslinking agent was added during preparation.

TABLE 1

| Gelling agent concentration: | | 50 lbs/1000 gal. water | |
|---|---|---|---|
| Initial pH: | | 7.62 | |
| Final pH: | | 7.50 | |
| Temperature (°F.) | Time at 200° F. (Min) | Total Time of Test (Min) | Apparent Viscosity at 170 sec$^{-1}$ (cp) |
| 74 | 0 | 0 | 82 |
| 100 | 0 | 2 | 45 |
| 120 | 0 | 4 | 40 |
| 140 | 0 | 6 | 34 |
| 160 | 0 | 8 | 33 |
| 180 | 0 | 12 | 28 |
| 200 | 10 | 22 | 25 |
| 200 | 20 | 32 | 24 |
| 200 | 30 | 42 | 24 |

TABLE 2

| Gelling agent concentration: | 50 lbs/1000 gal. water |
|---|---|
| Crosslinking Agent: | Titanium-triethanolamine chelate - polyhydroxy admixture |
| Crosslinking Agent Concentration: | 3 gal/1000 gal water |
| Initial pH | 10.00 |

TABLE 2-continued

Final pH 9.65

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 89 |
| 100 | 0 | 2 | 78 |
| 120 | 0 | 4 | 75 |
| 140 | 0 | 6 | 106 |
| 160 | 0 | 8 | 136 |
| 180 | 0 | 12 | 164 |
| 200 | 0 | 15 | 163 |
| 200 | 10 | 25 | 155 |
| 200 | 20 | 35 | 149 |
| 200 | 30 | 45 | 140 |

TABLE 3

| Gelling agent concentration: | 50 lbs/1000 gal. water |
|---|---|
| Crosslinking Agent: | Zirconium lactate |
| Crosslinking Agent Concentration: | 3 gal/1000 gal water |
| Initial pH | 7.6 |
| Final pH | 7.3 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 87 |
| 100 | 0 | 2 | 71 |
| 120 | 0 | 4 | 70 |
| 140 | 0 | 6 | 113 |
| 160 | 0 | 8 | 311 |
| 180 | 0 | 12 | 428 |
| 200 | 0 | 15 | 451 |
| 200 | 10 | 25 | 509 |
| 200 | 20 | 35 | 515 |
| 200 | 30 | 45 | 534 |

TABLE 4

| Gelling agent concentration: | 50 lbs/1000 gal. water |
|---|---|
| Crosslinking Agent: | Zirconium lactate |
| Crosslinking Agent Concentration: | 5 gal/1000 gal water |
| Initial pH | 7.6 |
| Final pH | 6.5 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 92 |
| 100 | 0 | 2 | 78 |
| 120 | 0 | 4 | 64 |
| 140 | 0 | 6 | 59 |
| 160 | 0 | 8 | 68 |
| 180 | 0 | 12 | 177 |
| 200 | 0 | 15 | 321 |
| 200 | 10 | 25 | 578 |
| 200 | 20 | 35 | 657 |
| 200 | 30 | 45 | 645 |

TABLE 5

| Gelling agent concentration: | 50 lbs/1000 gal. water |
|---|---|
| Crosslinking Agent: | Zirconium (IV) containing compound (6% ZrO$_2$ by weight) |
| Crosslinking Agent Concentration: | 3 gal/1000 gal water |
| Initial pH | 7.62 |
| Final pH | 6.82 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 89 |
| 100 | 0 | 2 | 80 |
| 120 | 0 | 4 | 118 |
| 140 | 0 | 6 | 154 |
| 160 | 0 | 8 | 423 |
| 180 | 0 | 12 | 462 |
| 200 | 0 | 15 | 465 |
| 200 | 10 | 25 | 477 |
| 200 | 20 | 35 | 477 |
| 200 | 30 | 45 | 492 |

TABLE 6

| Gelling agent concentration: | 50 lbs/1000 gal. water |
|---|---|
| Crosslinking Agent: | Zirconium (IV) containing compound (6% ZrO$_2$ by weight) |
| Crosslinking Agent Concentration: | 3 gal/1000 gal water |
| Buffer: | 5 lbs sodium bicarbonate |
| Buffer Concentration: | 5 lbs/1000 gal water |
| Buffer: | Sodium carbonate |
| Buffer Concentration: | 10 lbs/1000 gal water |
| Initial pH | 10.00 |
| Final pH | 9.98 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 207 |
| 100 | 0 | 2 | 369 |
| 120 | 0 | 4 | 935 |
| 140 | 0 | 6 | 851 |
| 160 | 0 | 8 | 787 |
| 180 | 0 | 12 | 722 |
| 200 | 0 | 15 | 674 |
| 200 | 10 | 25 | 616 |
| 200 | 20 | 35 | 550 |
| 200 | 30 | 45 | 503 |

TABLE 7

| Gelling agent concentration: | 50 lbs/1000 gal. water |
|---|---|
| Crosslinking Agent: | Zirconium acetylacetonate |
| Crosslinking Agent Concentration: | 3 gal/1000 gal water |
| Initial pH | 10.0 |
| Final pH | 9.98 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 82 |
| 100 | 0 | 2 | 75 |
| 120 | 0 | 4 | 109 |
| 140 | 0 | 6 | 250 |
| 160 | 0 | 8 | 538 |
| 180 | 0 | 12 | 630 |
| 200 | 0 | 15 | 637 |
| 200 | 10 | 25 | 656 |
| 200 | 20 | 35 | 652 |
| 200 | 30 | 45 | 643 |

TABLE 8

| Gelling agent concentration: | 50 lbs/1000 gal. water |
|---|---|
| Crosslinking Agent: | Zirconium (IV) containing compound (12.46% Zr by weight) |
| Crosslinking Agent Concentration: | 3 gal/1000 gal water |
| Initial pH | 4.02 |
| Final pH | 7.68 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 83 |
| 100 | 0 | 2 | 69 |
| 120 | 0 | 4 | 68 |
| 140 | 0 | 6 | 148 |
| 160 | 0 | 8 | 277 |
| 180 | 0 | 12 | 402 |
| 200 | 0 | 15 | 408 |
| 200 | 10 | 25 | 435 |
| 200 | 20 | 35 | 450 |
| 200 | 30 | 45 | 450 |

TABLE 9

| Gelling agent concentration: | 50 lbs/1000 gal. water |
|---|---|

TABLE 9-continued

| Crosslinking Agent: | Zirconium (IV) containing compound (12.46% Zr by weight) |
|---|---|
| Crosslinking Agent Concentration: | 3 gal/1000 gal water |
| Initial pH | 7.62 |
| Final pH | 9.19 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 85 |
| 100 | 0 | 2 | 78 |
| 120 | 0 | 4 | 103 |
| 140 | 0 | 6 | 433 |
| 160 | 0 | 8 | 942 |
| 180 | 0 | 12 | 1231 |
| 200 | 0 | 15 | 1237 |
| 200 | 10 | 25 | 1178 |
| 200 | 20 | 35 | 1121 |
| 200 | 30 | 45 | 1005 |

TABLE 10

| Gelling agent concentration: | 50 lbs/1000 gal. water |
|---|---|
| Crosslinking Agent: | Titanium lactate chelate |
| Crosslinking Agent Concentration: | 10 lbs/1000 gal water |
| Initial pH | 7.62 |
| Final pH | 4.10 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 99 |
| 100 | 0 | 2 | 81 |
| 120 | 0 | 4 | 81 |
| 140 | 0 | 6 | 119 |
| 160 | 0 | 8 | 176 |
| 180 | 0 | 12 | 227 |
| 200 | 0 | 15 | 232 |
| 200 | 10 | 25 | 237 |
| 200 | 20 | 35 | 236 |
| 200 | 30 | 45 | 235 |

TABLE 11

| Gelling agent concentration: | 50 lbs/1000 gal. water |
|---|---|
| Crosslinking Agent: | Titanium lactate chelate |
| Crosslinking Agent Concentration: | 10 lbs/1000 gal water |
| Buffer: | sodium bicarbonate |
| Buffer Concentration: | 2.5 lbs/1000 gal water |
| Initial pH | 7.6 |
| Final pH | 5.6 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 193 |
| 100 | 0 | 2 | 240 |
| 120 | 0 | 4 | 378 |
| 140 | 0 | 6 | 496 |
| 160 | 0 | 8 | 486 |
| 180 | 0 | 12 | 466 |
| 200 | 0 | 15 | 457 |
| 200 | 10 | 25 | 482 |
| 200 | 20 | 35 | 489 |
| 200 | 30 | 45 | 480 |

TABLE 12

| Gelling agent concentration: | 50 lbs/1000 gal. water |
|---|---|
| Crosslinking Agent: | Zirconium (IV) containing compound (22.1% Zr by weight) |
| Crosslinking Agent Concentration: | 10 lbs/1000 gal water |
| Buffer: | Fumaric acid |
| Buffer Concentration: | 5 lbs/1000 gal water |
| Initial pH | 3.30 |
| Final pH | 4.50 |

| Temperature (°F.) | Time at 200° F. (Min) | Total Time of Test (Min) | Apparent Viscosity at 170 sec$^{-1}$ (cp) |
|---|---|---|---|
| 74 | 0 | 0 | 444 |
| 100 | 0 | 2 | 447 |
| 120 | 0 | 4 | 398 |
| 140 | 0 | 6 | 367 |
| 160 | 0 | 8 | 325 |
| 180 | 0 | 12 | 277 |
| 200 | 0 | 15 | 253 |
| 200 | 10 | 25 | 217 |
| 200 | 20 | 35 | 211 |
| 200 | 30 | 45 | 216 |

The data set forth above clearly illustrates the thermal stability of the fracturing fluid of the present invention. The data also illustrates the surprising ability to crosslink the gelling agent at a pH in the range of from about pH 4 to about 11 and provide a stable gel utilizing titanium and zirconium crosslinking agents. Previously, it has not been considered possible to crosslink a cellulose derivative with a titanium or zirconium crosslinking agent at an elevated pH and still produce a stable gelled fracturing fluid.

To further illustrate the shear-thermal stability of the fluid of the present invention, the following test was performed.

A base gel was prepared by admixing a quantity of the gelling agent equivalent to 50 lbs per 1000 gallons of aqueous liquid with an aqueous liquid comprising a 2 percent by weight KCl solution and 5 percent by volume of methanol. The gelling agent was permitted to hydrate for 4 hours. The pH of the hydrated gel was 7.05. A 250 ml sample of the base gel then is placed in a Waring Blender and mixed at the maximum speed which could be obtained without resulting in significant air entrainment.

A quantity of a crosslinking agent comprising a zirconium IV containing compound (12.46% Zr by weight) was admixed with the base gel in an amount equivalent to 1 gallon per 1000 gallons of aqueous liquid. Mixing of the sample was continued for 5 minutes after addition of the crosslinking agent. The mixing action upon the gelled fluid simulates the shear forces the fracturing fluid will undergo during injection into a subterranean formation. A quantity of the sheared sample then was introduced into a Model 50 Fann viscometer. The viscometer was fitted with a #2 bob and a #1 spring. The sample was heated from about ambient to about 275° F. Viscosity sweeps were made at 450, 400, 350, 325, 300, 250, 200, 150 and 100 rpm initially and at periodic intervals as set forth in the following Table 13. The sample was sheared at 100 rpm during the intervals between the viscosity sweeps. Upon conclusion of the test, the pH of the fluid was 8.98. The apparent viscosity of the fluid was calculated and is set forth in the following Table

TABLE 13
Shear-Thermal Stability Determination

| Temperature (°F.) | Time at 275° F. (Min) | Total Time of Test (Min) | Apparent Viscosity at 170 sec$^{-1}$ (cp) |
|---|---|---|---|
| 80 | 0 | 3 | 106 |
| 275 | 0 | 20 | 277 |
| 275 | 15 | 35 | 272 |
| 275 | 30 | 50 | 218 |
| 275 | 45 | 65 | 206 |
| 275 | 60 | 80 | 235 |
| 275 | 75 | 95 | 216 |
| 275 | 90 | 110 | 170 |

TABLE 13-continued

| Shear-Thermal Stability Determination | | | |
|---|---|---|---|
| Temperature (°F.) | Time at 275° F. (Min) | Total Time of Test (Min) | Apparent Viscosity at 170 sec$^{-1}$ (cp) |
| 275 | 120 | 140 | 124 |

The date clearly illustrates the shear thermal stability of the fluid of the present invention.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:

1. A method for fracturing a subterranean formation comprising:
    preparing a fracturing fluid by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.2 percent by weight of said aqueous liquid and a crosslinking agent present in an amount of at least about 0.001 percent by weight of said aqueous liquid; and
    introducing said fracturing fluid into a subterranean formation at a rate and pressure sufficient to fracture said formation.

2. The method of claim 1 wherein said crosslinking agent comprises an organotitanate chelate containing titanium (IV) ions or a compound containing zirconium (IV).

3. The method of claim 1 wherein said crosslinking agent comprises a compound which provides ions of at least one member of the group consisting of titanium (IV), zirconium (IV), antimony (III), antimony (V), lead (II), aluminum (III), arsenic (III), chromium (III) and niobium (V).

4. The method of claim 1 wherein said crosslinking agent comprises at least one member selected from the group consisting of titanium acetylacetonate chelate, titanium triethanolamine chelate, titanium ammonium lactate chelate, zirconium acetylacetonate, zirconium lactate, zirconium carbonate and zirconium diisopropylamine lactate.

5. The method of claim 1 wherein said cellulose ether is hydroxyethylcellulose.

6. The method of claim 1 wherein the DS is in the range of about 0.7 to about 0.9.

7. The method of claim 1 wherein said fracturing fluid is defined further to contain a propping agent.

8. A method of fracturing a subterranean formation penetrate by a well bore comprising:
    preparing a fracturing fluid by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.2 percent by weight of said aqueous liquid and a crosslinking agent present in an amount of at least about 0.001 percent by weight of said aqueous liquid said gelling agent being prepared by charging said cellulose ether to a diluent system including water in an amount sufficient to swell said cellulose ether to provide a slurry in an enclosed reaction vessel, adding an alkaline material in an amount sufficient to catalyze the reaction of said cellulose ether, with a reactant capable of incorporating into said cellulose ether a pendent vicinal dihydroxy structure, adding said reactant over a predetermined period of time in an amount sufficient to react with and incorporate in said cellulose ether said degree of substitution of pendent vicinal dihydroxy structure, maintaining the temperature of said slurry of cellulose ether and said reactant at a temperature in the range of from about ambient to about the reflux temperature of the diluent system during said reaction, adding acid in an amount sufficient to neutralize the modified cellulose ether to form a water soluble cellulose ether product comprising said gelling agent; and
    introducing said fracturing fluid into a subterranean formation at a rate and pressure sufficient to fracture said formation.

9. The method of claim 8 wherein said crosslinking agent comprises an organotitanate chelate containing titanium (IV) ions or a compound containing zirconium (IV) ions.

10. The method of claim 8 wherein said crosslinking agent comprises a compound which provides ions of at least one member of the group consisting of titanium (IV), zirconium (IV), antimony (III), antimony (V), lead (II), aluminum (III), arsenic (III), chromium (III) and niobium (V).

11. The method of claim 8 wherein said crosslinking agent comprises at least one member selected from the group consisting of titanium acetylacetonate chelate, titanium triethanolamine chelate, titanium ammonium lactate chelate, zirconium acetylacetonate, zirconium lactate, zirconium carbonate and zirconium diisopropylamine lactate.

12. The method of claim 8 wherein said cellulose ether is hydroxyethylcellulose.

13. The method of claim 8 wherein the DS is in the range of about 0.7 to about 0.9.

14. The method of claim 8 wherein said fracturing fluid is defined further to contain a propping agent.

15. The method of claim 8 wherein said gelling agent is present in an amount of from about 0.2 to about 3.0 percent by weight of said aqueous fluid.

16. The method of claim 15 wherein said crosslinking agent includes a polyhydroxyl-containing compound selected from the group consisting of glycerol, erythritol, threitol, ribitol, arabinitol, xylitol, allitol, altritol, sorbitol, mannitol, dulcitol, iditol and perseitol.

17. The method of claim 16 wherein said polyhydroxyl-containing compound is present in an amount of from about 0.001 to about 0.25 percent by weight of said aqueous liquid.

* * * * *